C. H. AYARS.
COOKING MACHINE FOR CANNED GOODS.
APPLICATION FILED OCT. 29, 1919.
1,380,626.
Patented June 7, 1921.
4 SHEETS—SHEET 2.
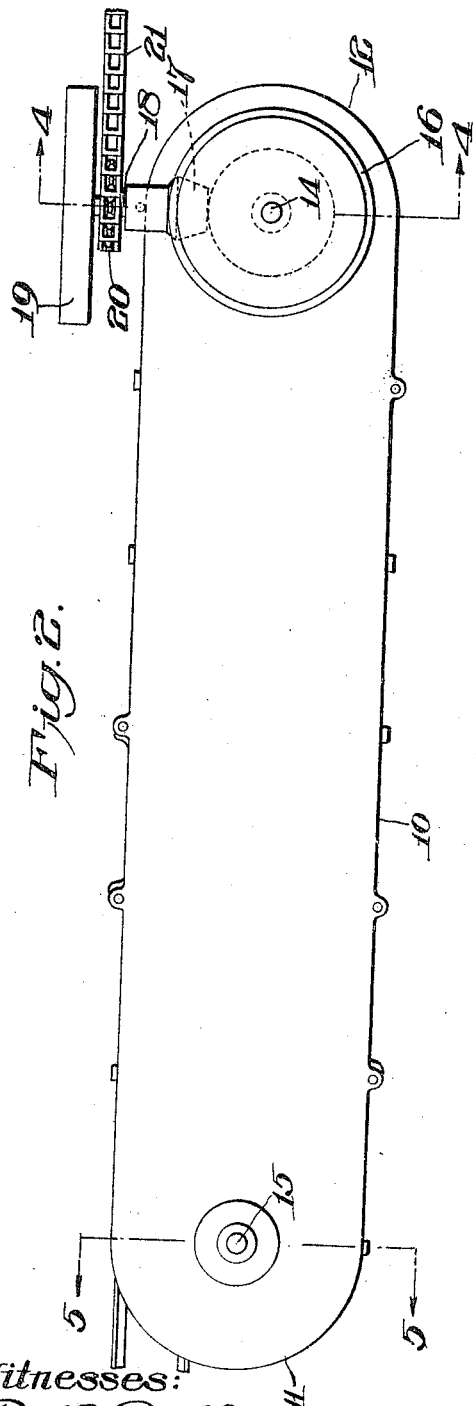
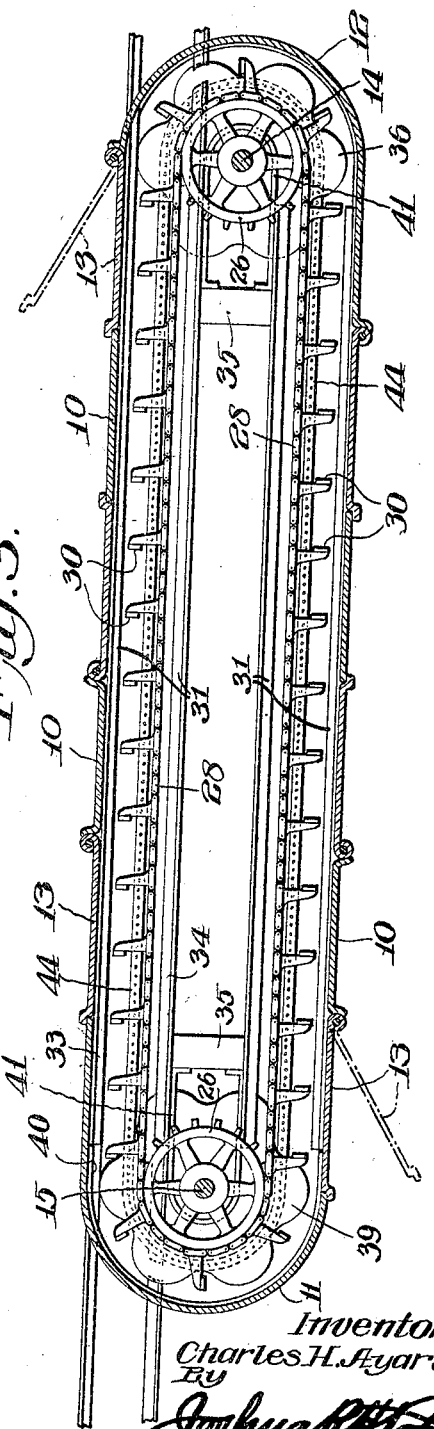

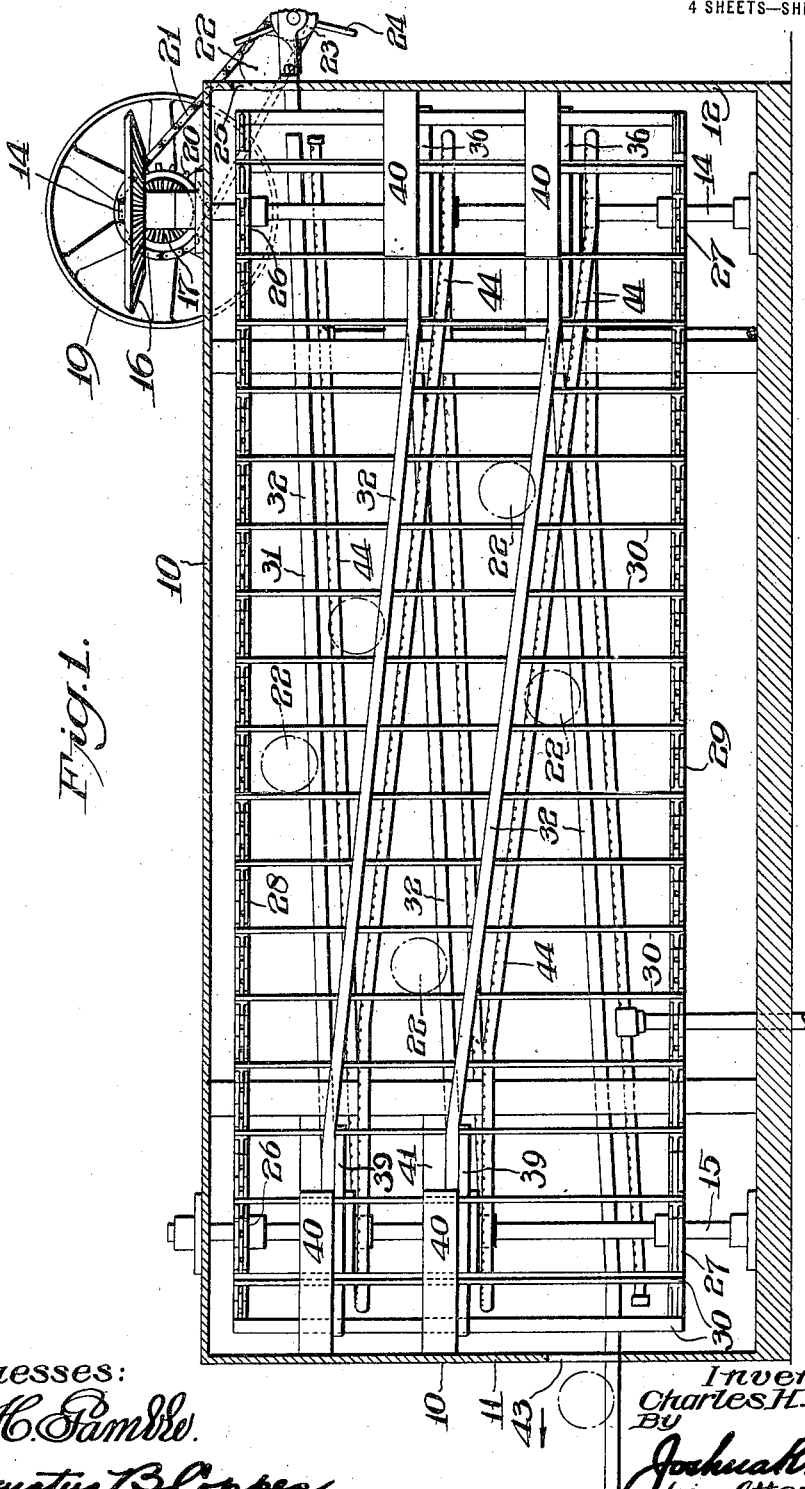

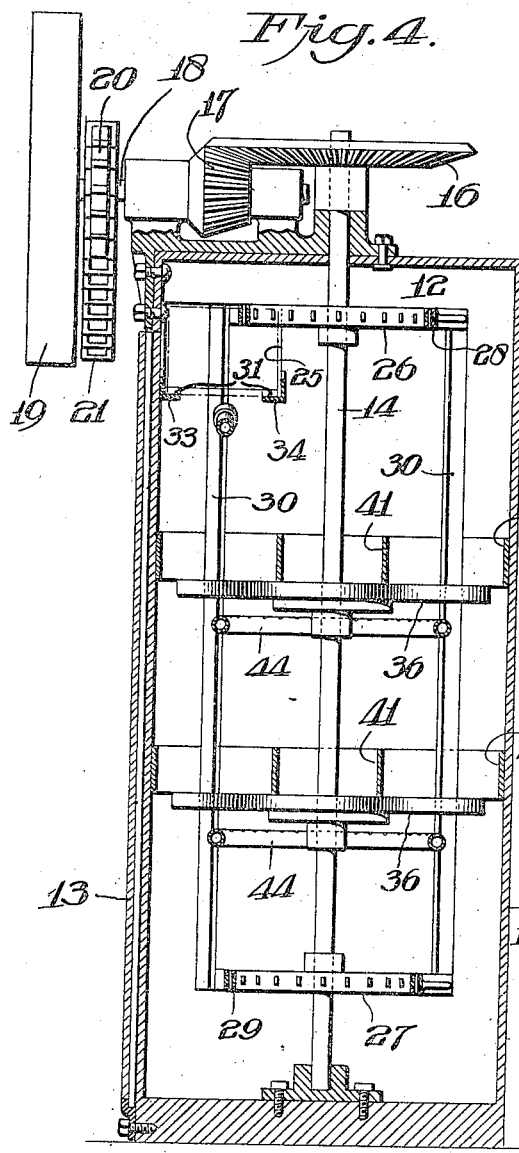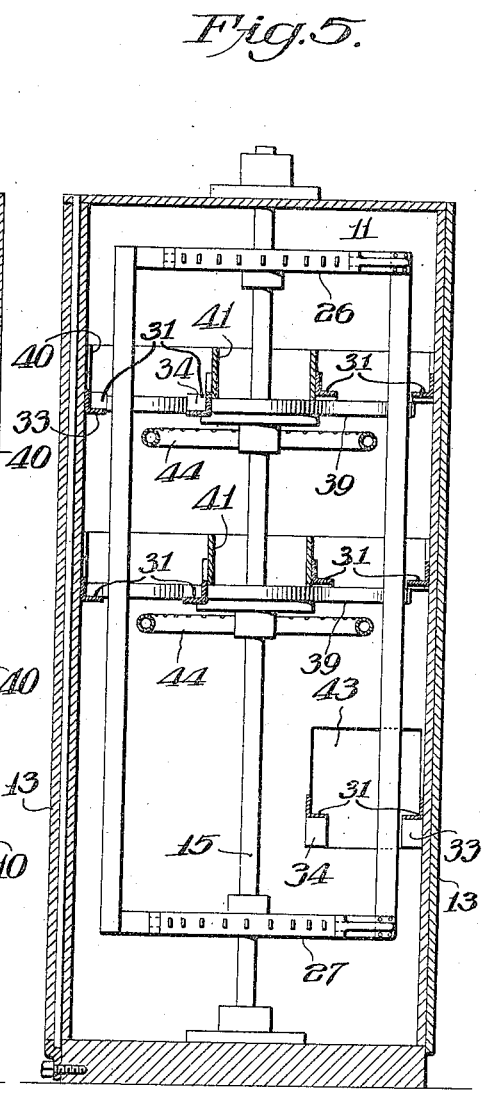

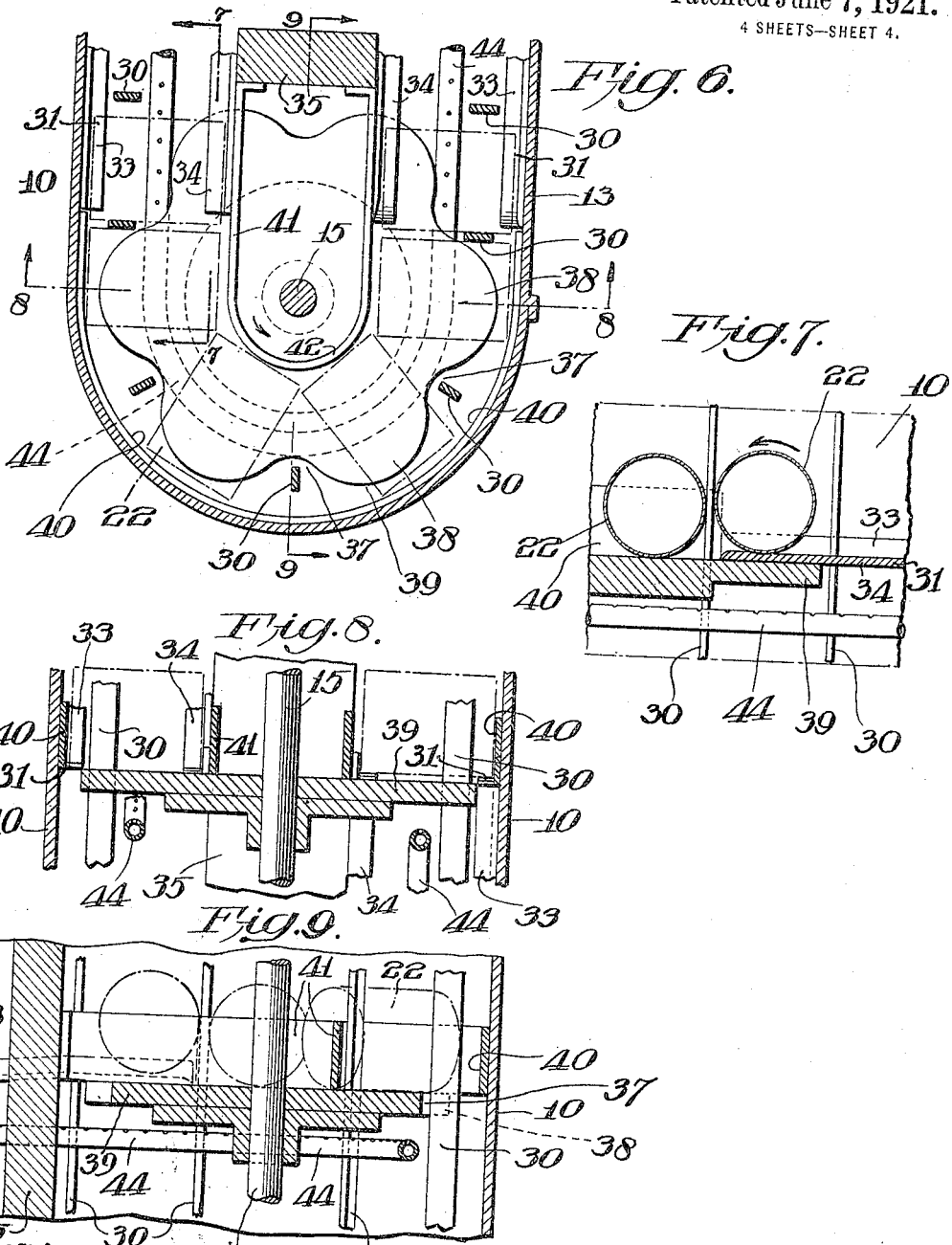

UNITED STATES PATENT OFFICE.

CHARLES H. AYARS, OF SALEM, NEW JERSEY.

COOKING-MACHINE FOR CANNED GOODS.

1,380,626.　　　　　Specification of Letters Patent.　　Patented June 7, 1921.

Application filed October 29, 1919. Serial No. 334,296.

*To all whom it may concern:*

Be it known that I, CHARLES H. AYARS, a citizen of the United States, residing at Salem, in the county of Salem and State of New Jersey, have invented certain new and useful Improvements in Cooking-Machines for Canned Goods, of which the following is a specification.

One object of my invention is to provide an improved cooking machine for canned goods which will be so constructed that the material within the cans will be properly cooked during the movement of the cans therethrough.

Another object is to so construct the parts of my improved machine that the cans will pass freely through the machine and that the chance of jamming of the cans, while thus passing through the machine, will be reduced to a minimum.

Another object is to so design my invention that access may be had to the cans in all parts of the machine so that if any of the cans should become jammed or injured that they will be quickly removed.

Another object is to make my invention of a simple and durable construction.

These objects, and other advantageous ends which will be described hereinafter, I attain in the following manner, reference being had to the accompanying drawings in which—

Figure 1 is a longitudinal sectional elevation of my improved machine,

Fig. 2 is a top plan view,

Fig. 3 is a horizontal sectional view taken longitudinally through the machine,

Fig. 4 is an enlarged transverse sectional elevation taken on the line 4—4 of Fig. 2, Fig. 5 is an enlarged transverse sectional elevation taken on the line 5—5 of Fig. 2, Fig. 6 is an enlarged fragmentary sectional plan view of one end of the machine showing the positions assumed by the cans as they pass around said end during the cooking operation, Fig. 7 is a fragmentary sectional elevation taken on the line 7—7 of Fig. 6, Fig. 8 is a fragmentary transverse section taken on the line 8—8 of Fig. 6, and Fig. 9 is an enlarged fragmentary section taken on the line 9—9 of Fig. 6.

Referring to the drawings, 10 represents a casing which is substantially semi-circular in cross sectional plan view at its opposite ends 11 and 12 and its opposite sides between the ends include a plurality of hinged panels or doors 13. These doors are arranged in series throughout the length of the casing so as to permit access to any part of the casing for the purpose of removing or fixing the position of any of the cans as they are passing through the machine as will hereinafter be described.

Two upright shafts 14 and 15 extend upwardly within the casing and these shafts are positioned substantially concentric with the curvature of the respective ends 11 and 12. The shaft 14 has a beveled gear 16 secured to its top outside of the casing and this beveled gear meshes with a beveled pinion 17 on a drive shaft 18. The drive shaft 18 can be rotated by any desired means and as illustrated a pulley 19 is secured thereon and a sprocket 20 on said drive shaft operates a chain 21 which actuates means for feeding the cans 22 into the machine. This feeding means may be of any desired character and in the present instance I have shown a wheel 23 having projecting fingers 24 adapted to feed the cans 22 through an opening 25 in the end 12 of the casing (see Fig. 1).

The shafts 14 and 15 have sprockets 26 secured thereto adjacent the top of the casing and sprockets 27 secured thereto adjacent the bottom of the casing. The sprockets 26 are operatively connected by a chain belt 28 and the sprockets 27 are operatively connected by a chain belt 29. Vertical bars 30 have their upper ends connected to the chain belt 28 and their lower ends connected to the chain belt 29. These bars are spaced apart a distance slightly greater than the diameter of the cans to be passed through the machine.

A track 31 is made up of a number of inclined sections 32 and each of the sections comprises angle rails 33 and 34 spaced apart. The rails 33 are secured to the inner surface of the casing while the rails 34 are secured to standards 35, as clearly shown in Figs. 6 and 8. The shaft 14 has plates or disks 36 secured thereto and these disks are spaced apart as clearly shown in Fig. 4. The disks 36 have their edges recessed as shown at 37 to provide lobes 38. In like manner, the shaft 15 has plates or disks 39 secured thereto and which are of the same construction as the disks 36, but are arranged as different levels as clearly shown in Fig. 1. Arcuate guard plates 40 are secured to the inner surface of the ends of the casing 10 adjacent the respective disks 36 and 39, and inner guards 41 (see Fig. 6) are secured to the standards 35 and have arcuate portions 42 which are arranged concentric with the respective shafts 14 and 15.

The uppermost section 32 of the track 31 slants downwardly from the opening 25 to the uppermost disk 39 on the shaft 15 and is located adjacent one side of the casing. Another section 32 of the track extends from the opposite side of the casing adjacent said latter mentioned disk and slants downwardly on the opposite side of the casing to the uppermost disk 36. Another section slants downwardly from the opposite side of said latter mentioned disk 36 to the lowermost disk 39 and so on the inclined sections of the track extend in a zig-zag manner longitudinally of the casing and the lowermost section leads out of the end 11 of the casing through an opening 43.

The bars 30 are so spaced that they pass between the rails of the track sections and form spacing means for the cans as they roll down the inclined sections of the tracks. These bars 30 are also so spaced as to occupy the space provided by the recess 37 of the disks 36 and 39, as clearly shown in Fig. 6.

A perforated steam pipe 44 is positioned within the casing 10 and has portions mounted below the various sections of the track 31 so that during the movement of the cans through the casing, the steam from the pipe 44 will cook the material within the cans.

The operation of my improved machine is as follows: The cans 22 enter the casing 10 through the opening 25 and roll down the uppermost section 32 of the track 31 toward the end 11. By being spaced between the bars 30 and due to the fact that the bars 30 when making a turn occupy the spaces provided by the recess 37 of the disks 36 and 39, the cans will move from the track sections upon the respective lobes 38 of the disks. As soon as the cans engage the disks the cans will stop rolling and will be conveyed by the disks around the end of the casing and will then be pushed upon the next descending section of the track. This is an important and valuable part of my invention, since it permits the cans to make the turn at the end of the casing without rolling or without being pushed. The cans therefore will not jam in making the turn and will be in their proper position to move upon the next descending section of the track.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A machine of the character described including an elongated casing; a track within the casing and having sections adjacent the opposite sides of said casing, said sections extending in a zig-zag manner from the top to the bottom of said casing; and conveying means including belts at different levels having common upright members secured thereto and spaced apart and movable longitudinally adjacent the track sections at different levels whereby articles on said sections will be moved by said common upright members along all sections of the track from the top to the bottom; substantially as described.

2. A machine of the character described including an elongated casing; a track within said casing having sections adjacent opposite sides of the casing, said sections terminating short of the ends of said casing and extending in zig-zag manner from the top to the bottom of said casing; rotatable plates adjacent opposite ends of the casing and having portions extending between the ends of the casing and having portions extending between the ends of the respective track sections whereby articles placed upon said track sections will pass along said track sections and upon said plates so that said plates will convey said articles from one track section on one side of the casing to a track section on the opposite side of the casing; and conveying means including belts positioned at different levels and having common upright members secured thereto and spaced apart, said common members being movable by said belts longitudinally of the track sections at different levels to move said articles successively along said track sections between said plates; substantially as described.

3. A machine of the character described including a casing; a track positioned within said casing and having sections adjacent opposite sides of said casing, said sections terminating short of the ends of said casing and extending in a zig-zag manner from the top toward the bottom of the casing; rotatable shafts adjacent opposite ends of the casing; plates secured to said shafts and having portions extending between the ends of the respective track sections whereby articles placed upon said track sections will pass upon said plates and be conveyed from the track section on one side of the casing to the track section on the opposite side of the casing; wheels secured to each of said shafts at different levels; belts respectively and operatively connecting the upper and lower wheels on said shafts; and common upright members having opposite ends respectively secured to said belts and movable longitudinally of the track sections to move said articles successively along said sections between said plates; substantially as described.

In testimony whereof I have signed my name to this specification in the presence of two subscribing witnesses.

CHARLES H. AYARS.

Witnesses:
 ANNA RENTON,
 CHAS. E. POTTS.